(12) United States Patent
Erickson et al.

(10) Patent No.: US 8,421,600 B2
(45) Date of Patent: Apr. 16, 2013

(54) UTILIZING AN RFID TAG IN MANUFACTURING FOR ENHANCED LIFECYCLE MANAGEMENT

(75) Inventors: Steven C. Erickson, Rochester, MN (US); Ivory Wellman Knipfer, Rochester, MN (US); Jeffrey George Komatsu, Kasson, MN (US); Fraser Allan Syme, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 237 days.

(21) Appl. No.: 12/173,052

(22) Filed: Jul. 15, 2008

(65) Prior Publication Data

US 2008/0266058 A1 Oct. 30, 2008

Related U.S. Application Data

(63) Continuation of application No. 11/360,348, filed on Feb. 23, 2006, now Pat. No. 7,493,181.

(51) Int. Cl.
*H04Q 5/22* (2006.01)
(52) U.S. Cl.
USPC .................. 340/10.51; 340/10.52; 340/5.92; 700/213
(58) Field of Classification Search .... 340/572.1–572.9, 340/5.92, 10.51; 700/213–244, 107; 235/375–385; 705/28–29
See application file for complete search history.

(56) References Cited

U.S. PATENT DOCUMENTS

| | | | |
|---|---|---|---|
| 6,047,579 A * | 4/2000 | Schmitz | 72/15.1 |
| 6,351,684 B1 | 2/2002 | Shirley et al. | |
| 6,546,304 B2 | 4/2003 | Thorvaldsson et al. | |
| 6,901,304 B2 | 5/2005 | Swan et al. | |
| 6,941,184 B2 | 9/2005 | Ebert | |
| 7,158,850 B2 | 1/2007 | Cheng et al. | |
| 7,423,547 B2 | 9/2008 | Pavlovic et al. | |
| 7,441,320 B2 | 10/2008 | Hass et al. | |

(Continued)

FOREIGN PATENT DOCUMENTS

CN 1695161 11/2005

OTHER PUBLICATIONS

Office Action dated Mar. 7, 2007 for U.S. Appl. No. 11/360,348, filed Feb. 23, 2006.

(Continued)

*Primary Examiner* — Daniel Wu
*Assistant Examiner* — Frederick Ott
(74) *Attorney, Agent, or Firm* — Martin & Associates, LLC; Bret J. Peterson

(57) ABSTRACT

Data associated with supply chain events for a manufactured assembly is automatically stored. In preferred embodiments the supply chain events for the manufactured assembly are stored on an RFID tag attached to the assembly as it travels through the supply chain to insure the data concerning the assembly is readily available and not separated from the assembly. In other embodiments, the supply chain events or characteristic data is stored on the RFID tag in a hierarchical structure beginning with the original state of the assembly and with additional entries for each step in the assembly process. In other embodiments, as the product undergoes rework, conversion to a different assembly, or personalizations, the new state of the assembly is stored in the RFID tag. In other preferred embodiments, other information is also stored on the RFID tag such as country of origin, failure data, cycle times and a quality status indicator.

8 Claims, 5 Drawing Sheets

U.S. PATENT DOCUMENTS

| | | | |
|---|---|---|---|
| 2003/0102367 A1 | 6/2003 | Monette et al. | |
| 2003/0209601 A1* | 11/2003 | Chung | 235/385 |
| 2003/0227392 A1 | 12/2003 | Ebert et al. | |
| 2004/0008123 A1* | 1/2004 | Carrender et al. | 340/825.49 |
| 2005/0073435 A1* | 4/2005 | Voeller et al. | 340/933 |
| 2005/0131763 A1 | 6/2005 | Junger | |
| 2005/0193222 A1 | 9/2005 | Greene | |
| 2005/0236479 A1* | 10/2005 | Schmidtberg et al. | 235/384 |
| 2005/0256788 A1* | 11/2005 | Mukai | 705/29 |
| 2006/0027646 A1* | 2/2006 | Haberler | 235/380 |
| 2007/0114280 A1* | 5/2007 | Coop et al. | 235/385 |
| 2008/0157928 A1 | 7/2008 | Butler et al. | |

OTHER PUBLICATIONS

Office Action dated Sep. 11, 2007 for U.S. Appl. No. 11/360,348, filed Feb. 23, 2006.

Office Action dated Mar. 17, 2008 for U.S. Appl. No. 11/360,348, filed Feb. 23, 2006.

Office Action dated May 12, 2009 for U.S. Appl. No. 12/173,050, filed Jul. 15, 2008.

Office Action dated Dec. 22, 2009 for U.S. Appl. No. 12/173,054, filed Jul. 15, 2008.

http://www.rfidinternational.com/news.php?action=full_news&NewsID=5, "Manufacturing & Supply Chain Solutions RFID", pp. 1-3, Oct. 13, 2005.

Achilleas Anagnostopoulos, "The RFID Filesystem Whitepater", pp. 1-10, http://www.spinellis.gr/ismr/hof/05-aa-report.pdf, 2005.

http://www.rfidnews.org/news/2004/10/05/matsushita-develops-rfid-sd-memory-card, "Matsushita Develops RFID SD Memory Card", pp. 1-2, Jun. 21, 2006.

* cited by examiner

| | Vendor ID 210 | Part Number 220 | Serial Number 230 | Date/Time 240 | Content 250 |
|---|---|---|---|---|---|
| 360 | Vendor A | PN 12345 | SN 12345 | 03.24.2005 10:25:32 | <Content List> |
| 362 | Vendor B | PN 54321 | SN 54321 | 03.27.2005 13:35:22 | <Content List> |
| 364 | Vendor C | PN 67890 | SN 67890 | 04.28.2005 23:30:00 | <Content List> |
| 366 | Vendor C | PN 67890 | SN 67890 | 04.28.2005 23:45:17 | <Content List> |
| 368 | Vendor D | PN 12345 | SN 09876 | 05.15.2005 03:00:08 | <Content List> |
FIG. 5
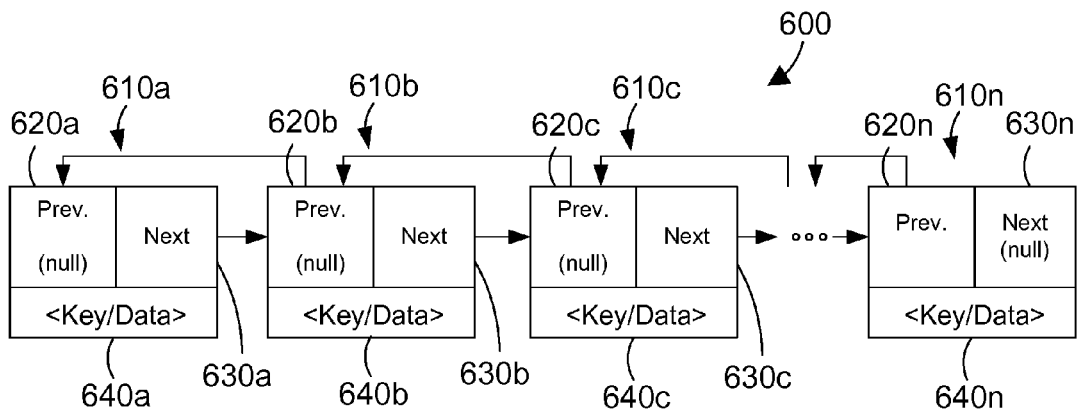
FIG. 6
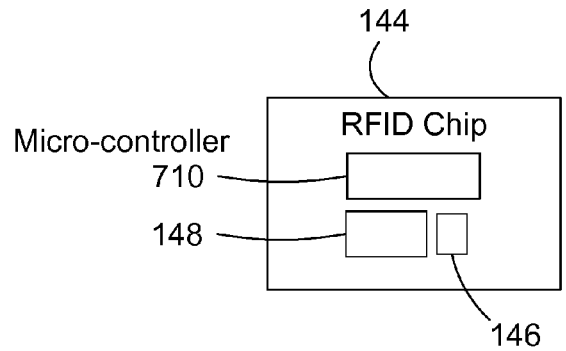
FIG. 7

UTILIZING AN RFID TAG IN MANUFACTURING FOR ENHANCED LIFECYCLE MANAGEMENT

CROSS-REFERENCE TO PARENT APPLICATION

This patent application is a continuation of U.S. Ser. No. 11/360,348 filed on Feb. 23, 2006, which is incorporated herein by reference.

BACKGROUND OF THE INVENTION

1. Technical Field

This invention generally relates to RFID tags, and more specifically relates to utilizing an RFID tag in a manufacturing environment and an improved method and apparatus to store historical data on the RFID tag.

2. Background Art

Through strategic product outsourcing, manufacturers continue to drive more and more manufacturing and product content to vendors that specialize in certain technologies. This product outsourcing allows primary manufacturers to specialize in technologies that provide the most value added content to their customers. A manufactured assembly may consist of multiple levels of assemblies and part numbers produced by several vendors in the chain of producing the assembly. Further, due to errors in supply/demand planning, order skew, configuration variability, as well as product defects, a manufacturer may need to change or re-personalize many of the purchased assemblies. In order to re-personalize or re-configure the assemblies it is important for the manufacturer to know exactly the current state as well as the history of the assembly.

Manufacturers may require its vendors to create a hierarchal data structure of the assemblies and supply the data to the manufacturer. The data is typically placed in a database. The data can then be used to reconfigure the product assemblies and the database updated to reflect the reconfiguration. This solution is costly and the product identity of previous sub-assemblies can be lost due to product reconfiguration. If an item is returned to the original vendor, there may be no original part number identification on the assembly for the vendor to verify its own assembly, which may require the manufacturer to search its records to prove the vendor is the original manufacturer of the assembly.

RFID tags are commonly used in the manufacturing industry to track and identify goods throughout the manufacturing process and for shipment to customers. RFID tags are similarly used by the end retailers. However, when RFID tags have been utilized in the manufacturing process, they have been used to only record "point in time" data, or the current status of the assembly. FIG. 2 shows a data record 200 for a prior art RFID tag. The data record shows the current state of the assembly by showing the part number 210, serial number 220 and other content 230. The information stored on the typical RFID tag as shown in FIG. 2 does not record the historical activities performed on the assembly and hierarchal information of the assembly such as the changing part number. This additional information is typically supplied to the manufacturer in a database format from the various vendors as described above.

Without a way to manage the history of a manufactured assembly in a complex supply chain, manufacturers will continue to bear the high costs of maintaining data from multiple vendors and other costs associated with re-configuring product assemblies.

DISCLOSURE OF INVENTION

The preferred embodiments herein describe a method and apparatus to store the supply chain events for a manufactured assembly. In preferred embodiments the supply chain events for the manufactured assembly are stored on an RFID tag attached to the assembly as it travels through the supply chain to insure the data concerning the assembly is readily available and not separated from the assembly.

In other preferred embodiments, the supply chain events or characteristic data is stored on the RFID tag in a hierarchical structure such as a dynamically linked list, where data is stored beginning with the original state of the assembly and additional entries are added for each step in the assembly process. In other embodiments, as the product undergoes rework, conversion to a different assembly, or personalizations, the new state of the assembly is stored in the RFID tag in addition to previously-stored information. In other preferred embodiments, other information is also stored on the RFID tag such as country of origin, failure data, cycle times and a quality status indicator.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 5 is a table of data representing an as built history according to preferred embodiments;

FIG. 6 is a block diagram of a dynamically linked list for storing an as built history according to preferred embodiments;

FIG. 7 is a block diagram of an RFID chip according to preferred embodiments;

BEST MODE FOR CARRYING OUT THE INVENTION

Figures 1, 2:
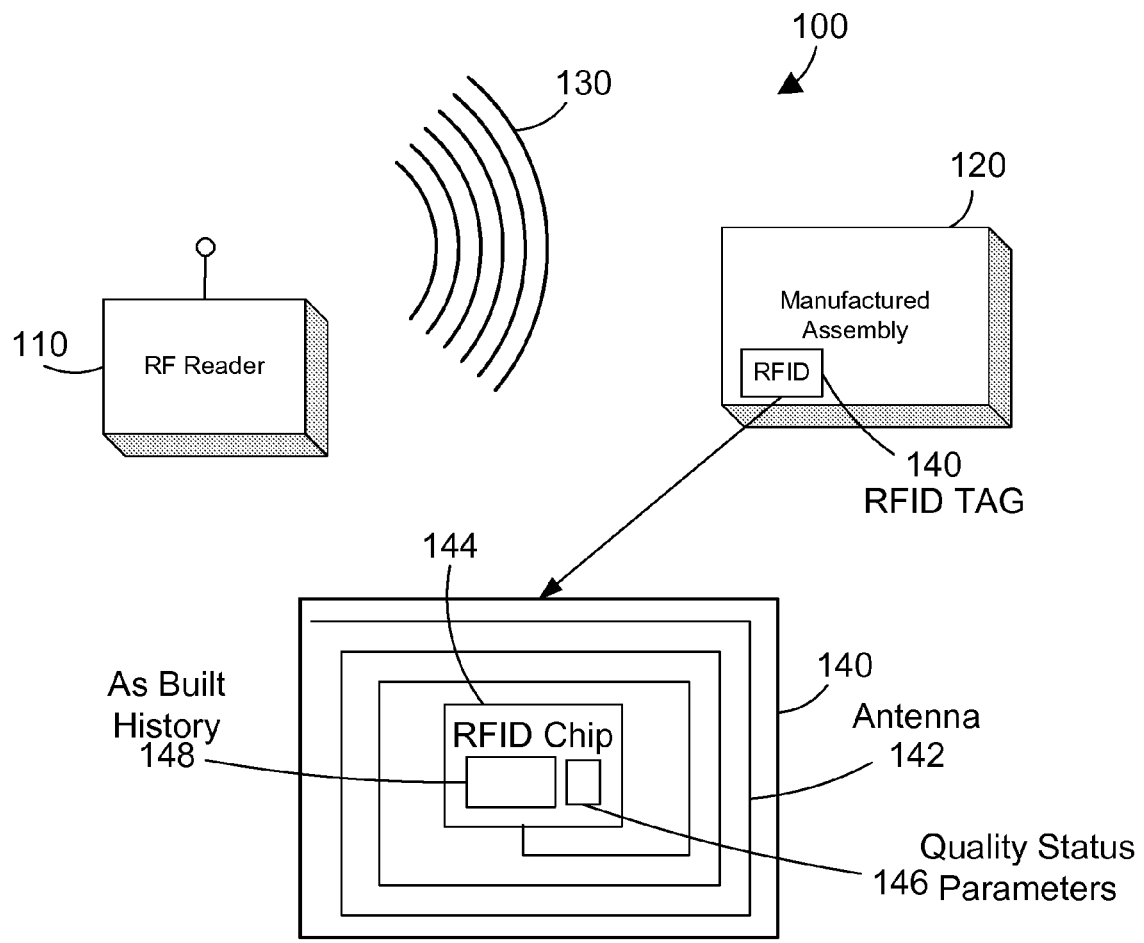
FIG. 1 is a block diagram of an RFID Tag used with an RFID tag reader according to preferred embodiments.
FIG. 2 is another system block diagram of RFID tag data according to the prior art.

The present invention relates to an apparatus and method to utilize an RFID tag in manufacturing. FIG. 1 shows a block diagram that represents an RFID tag in a manufacturing environment according to preferred embodiments herein. An RFID reader 110 communicates with a manufactured assembly 120 with an RFID signal 130 to an RFID tag 140 located on the assembly 120. The RFID tag 140 includes an antenna 142 to receive the RFID signal 130 to activate and communicate with the RFID chip 144. In preferred embodiments, the RFID chip 144 includes a quality status indicator 146 and an as built history 148 to store data associated with supply chain or manufacturing events to create a hierarchical history of the manufactured assembly 120. A manufacturing event is recorded for each significant change in the status of the assembly, such as adding a new sub-assembly or performing a manufacturing step on the assembly.

Again referring to FIG. 1, the quality status parameters 146 are similar to manufacturing events, but are specifically used to indicate quality control parameters of the assembly. In preferred embodiments, the quality status parameters includes a usability indicator to indicate an overall good/bad status of the part. Data associated with the usability indicator can give specific information about the quality issues for the assembly. The usability indicator, and other quality control parameters are used to quickly determine the status of the assembly to control movement and disposition of the assembly through the manufacturing process. This feature of the preferred embodiments embeds the usability of an assembly with the RFID tag attached to the assembly to insure the status is not lost with assembly paperwork. Further the quality status parameters can be easily passed between vendors in the supply chain.

Figure 3:
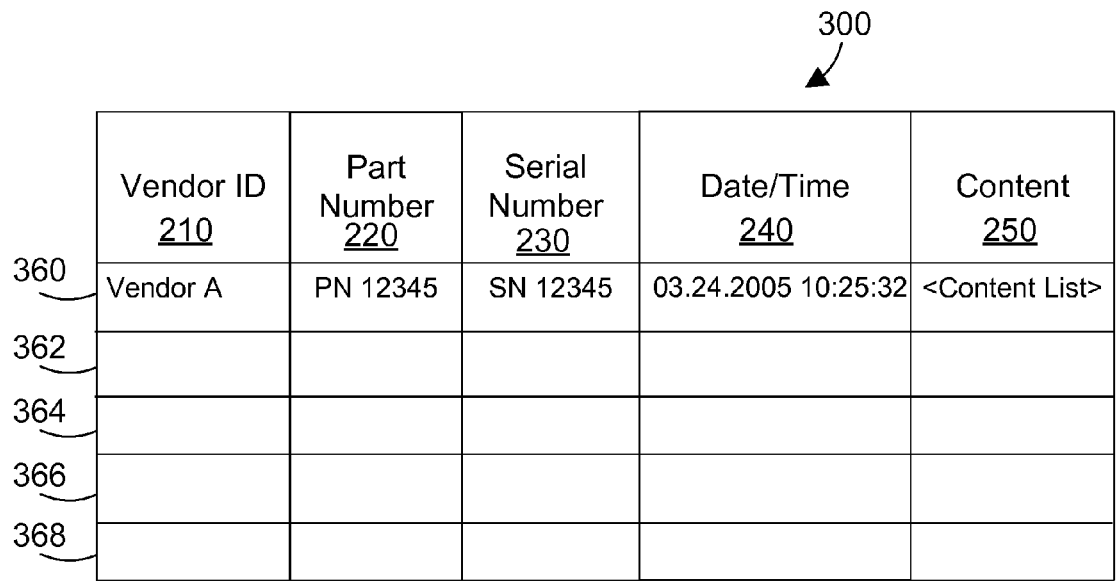
FIG. 3 is a table of data representing an as built history according to preferred embodiments.
Figure 4:
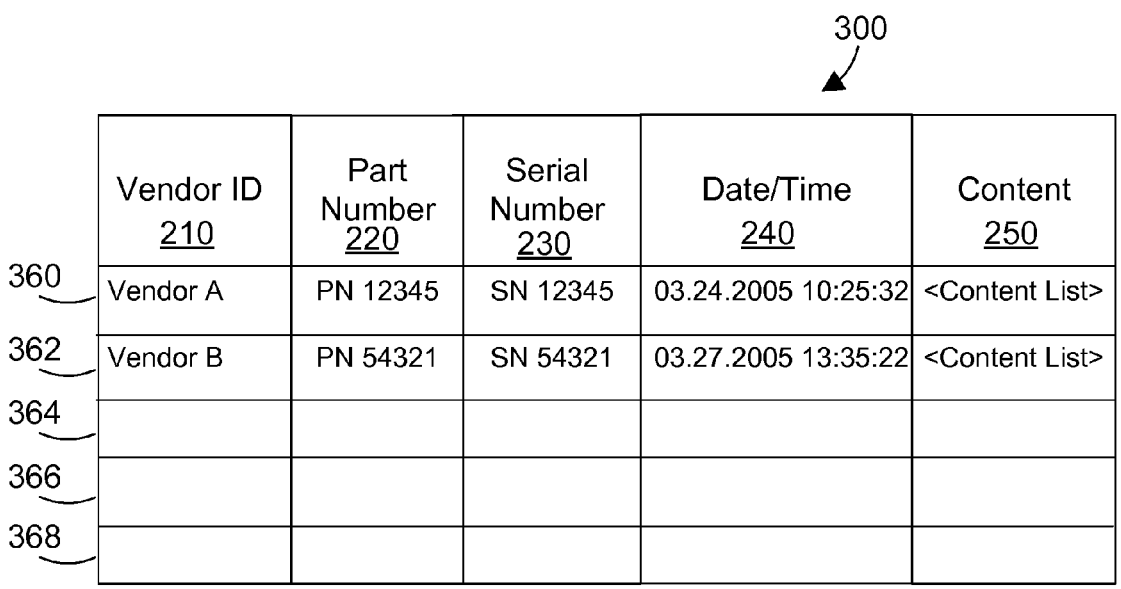
FIG. 4 is a table of data representing an as built history according to preferred embodiments.

According to preferred embodiments, supply chain events for a manufactured assembly are stored on the RFID tag 140 attached to the assembly as it travels through the supply chain to insure the data concerning the assembly is readily available and not separated from the assembly. FIGS. 3-5 illustrate an example of an as built history 148 shown in FIG. 1 according to a preferred embodiment. In this example, the as built history is represented as a table 300 of data that is stored on the RFID chip 144. In this example, the as built history table 300 includes a vendor ID 310, part number 320, serial number 330, data/time 340 and content of the history entry 350. Each entry 360, 362, 364, 366, 368 of the table is data for a unique manufacturing event. The content of the history entry contains other data associated with the assembly for the manufacturing event. This other data could include the country of origin, the part cost, a commodity code, revision of embedded code, part description, etc.

Again referring to FIG. 3, when a first assembly or subassembly is built an RFID tag is attached to the assembly by the vendor. The as built history table 300 in the RFID tag is initially loaded by the first vendor in the supply chain to start the as built history of the assembly. The first vendor (Vendor A) records data in the first entry 260 in the table 300 as shown in FIG. 3. In this embodiment, when a vendor makes changes or additions to an assembly, all the data in the table 300 is read and stored in the RF reader 110 (FIG. 1), new data is appended to the read data and then the combined data is loaded into the table. This read and then re-write process is necessary when the RFID tag has a flash memory that is written to as a single block. Thus, in the illustrated example, Vendor B reads the data in the first record 260, concatenates data for a new entry, and stores the data into the as built history 300. The table 300 then has the first entry 260 restored back into the first position in the table, as well as the new second entry 262 stored in the second position as shown in FIG. 4. In this manner the supply chain events are stored on the RFID tag in a hierarchical structure beginning with the original state of the assembly and with additional entries for each step in the assembly process. An example of a completed table 300 of data for an assembly is represented in FIG. 5 which has three additional entries 364, 366, 368. The part number and serial number of the entries change to reflect the changing nature of the assembly as sub-assemblies are added and manufacturing steps are applied to the assembly.

The method described with reference to FIGS. 3-5 requires each vendor application accessing the data on the RFID tag to concatenate any new data with previous data storing the concatenated data back into the as built history table 300. This embodiment solves some of the problems described with reference to the prior art, but it requires that each supplier's application concatenate and reload the data. Further, this method does not ensure the integrity of the hierarchal history will be maintained as described in the embodiments described below.

FIG. 6 illustrates a linked list data structure 600 to store the as built history 148 (FIG. 1) according to other preferred embodiments. When a vendor makes changes or additions to an assembly, the data in the RFID chip 144 can be read for reference, but any existing data is not modified, and new data is appended to the existing data using the linked list 600. The linked list has multiple records 610 that each have a previous link 620, a next link 630 and a data field 640. The previous link 620a of the first record 610a and the next link 630n of the last record 610n are coded as a null link to indicate the beginning and end of the linked list respectively. The data field 640 of each record 610 is loaded with the data of a single entry in the as built history table 300 as described above with reference to FIGS. 3-5. For example, the data field 640a in the first record 610a is loaded with the data shown in first data entry 360 in FIG. 5 and the second data field 610b is loaded with the data shown in the second data entry 362. The other data fields are loaded in a similar manner so that the linked list contains the data in a hierarchal structure based on the sequence the records were added to the linked list by one or more vendors.

FIG. 7 illustrates an RFID chip 144 to implement the linked list described in FIG. 6 according to a preferred embodiment. The RFID chip 144 includes a micro-controller 710 to process commands from the RFID reader (110 FIG. 1). The micro-controller is a low power, small instruction set microcontroller or state machine that gives the RFID controller a limited processing capability to respond to commands from the RFID reader. The commands instruct the RFID chip to manage the dynamic linked list described above to allow the reader to selectively write records to the linked list rather than writing the whole as built history at once in the manner described in the previous embodiment. The commands to manage the linked list are similar to those commands known in the prior art to access a linked list. Some basic commands include initialize the data storage, add data to head of the list, read head node, read a node at a list location, and clear the list.

Figure 8:
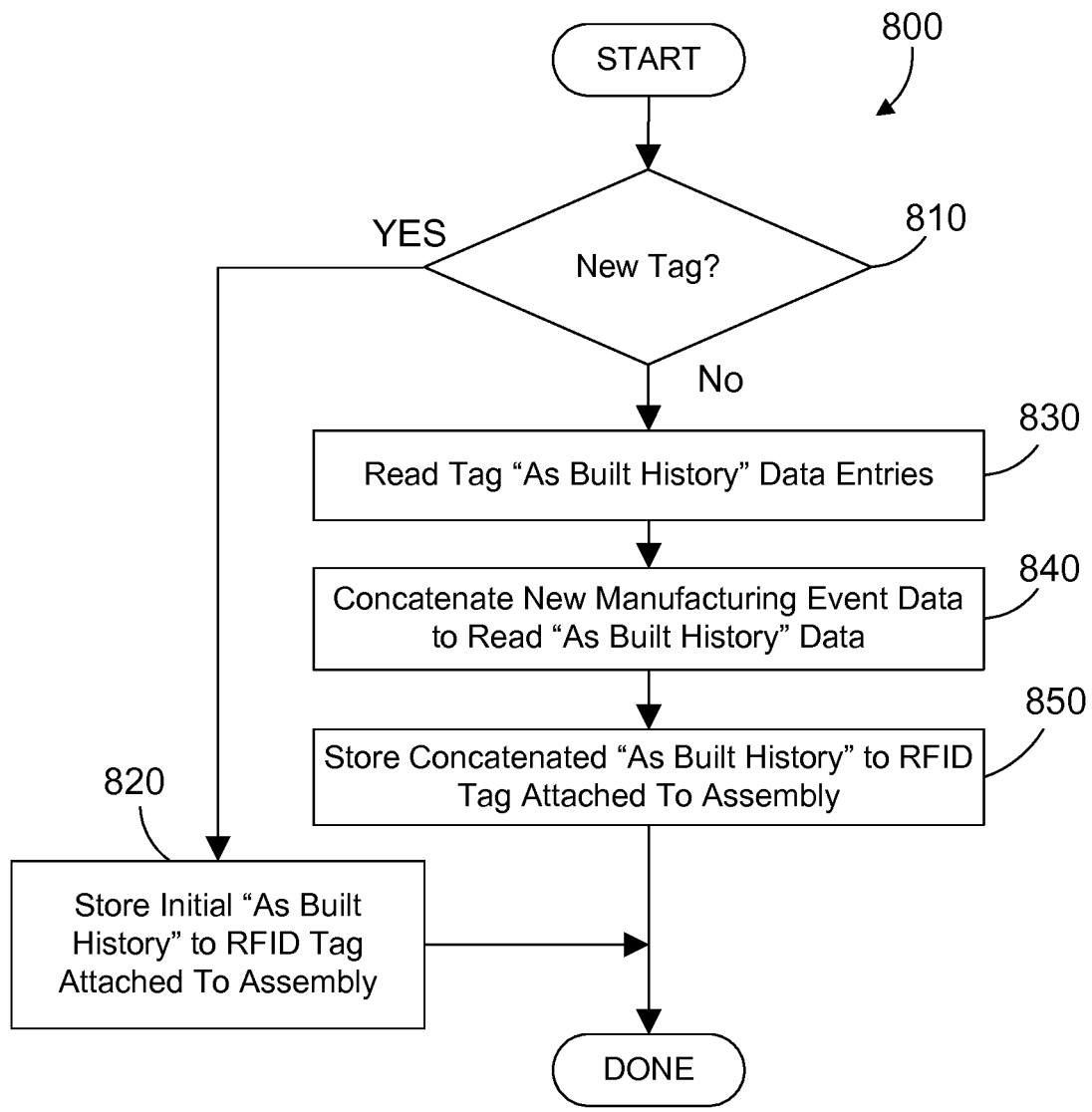
FIG. 8 method diagram for storing an as built history according to preferred embodiments.

FIG. 8 shows a method 800 for storing an "as built history" according to preferred embodiments herein. If the RFID tag is a new tag being placed on a new first assembly (step 810=yes) then the initial vendor information and assembly information is stored on the RFID tag attached to the assembly (step 820). The RFID tag need not be directly attached to the assembly but is associated with the assembly, such as attached to the packaging. If the RFID tag is not a new tag (step 810=no) then the complete as built history stored on the RFID tag is read into the RFID reader (step 830). The new manufacturing event is concatenated with the as built history read from the RFID tag (step 840) and the concatenated as built history is stored to the RFID tag attached to the assembly (step 850). The method is then done.

Figure 9:
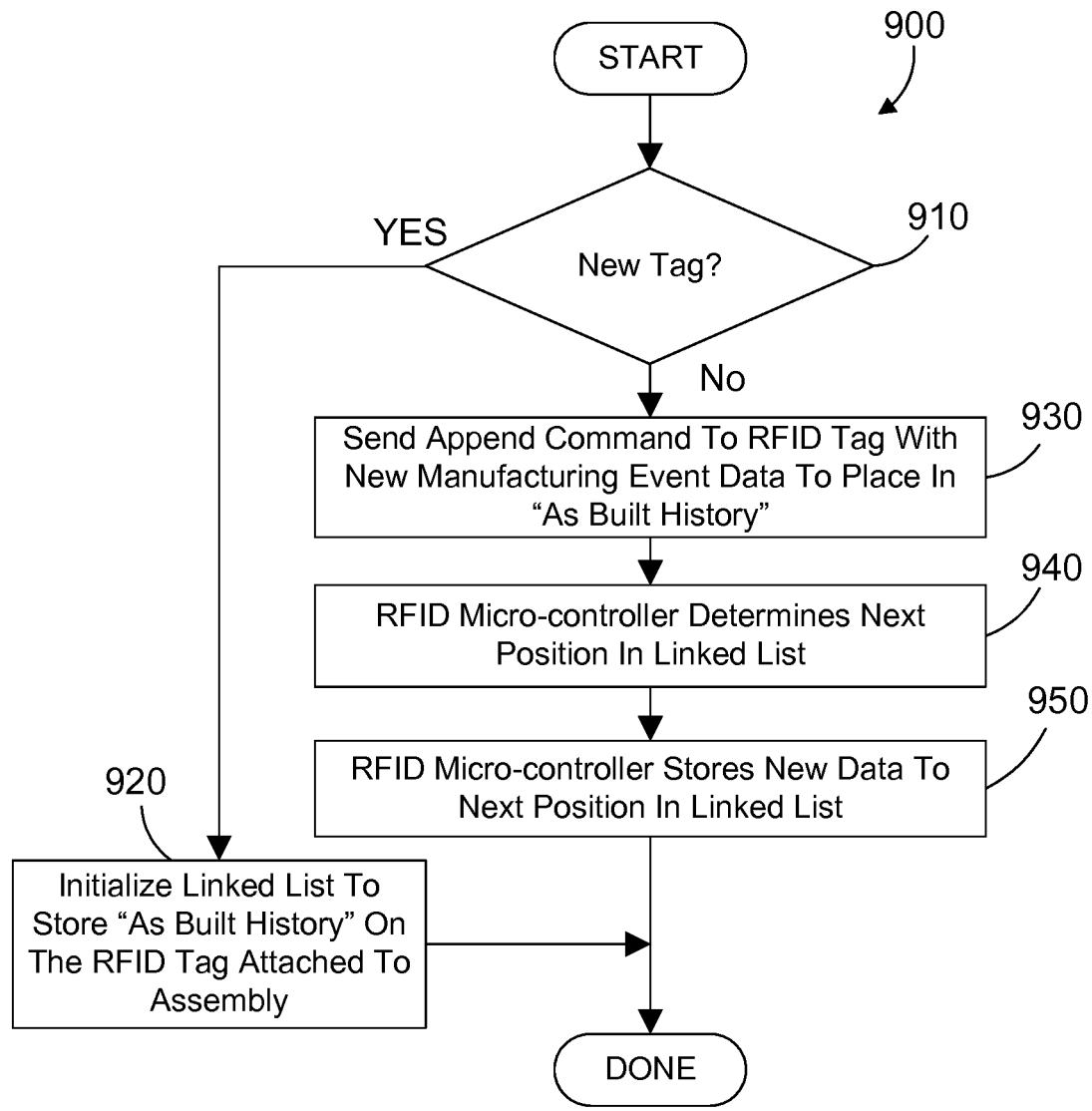
FIG. 9 method diagram for storing an as built history according to other preferred embodiments.

FIG. 9 shows another method 900 for storing an "as built history" according to preferred embodiments herein. If the RFID tag is a new tag being placed on a new first assembly (step 910=yes) then a linked list is initialized on the RFID tag attached to the assembly and the initial vendor information and assembly information is stored in the linked list (step 920). The RFID tag need not be directly attached to the assembly but is associated with the assembly, such as attached to the packaging. If the RFID tag is not a new tag (step 910=no) then an append command is sent to the RFID tag with the new manufacturing event data to place in the as built history (step 930). The RFID micro-controller determines the next position in the linked list (step 940) and new data is stored in the next position of the linked list of the built history on the RFID tag attached to the assembly (step 950). The method is then done.

As described above, embodiments provide a method and apparatus to store the supply chain events for a manufactured assembly. In preferred embodiments the supply chain events for the manufactured assembly are stored on an RFID tag attached to the assembly as it travels through the supply chain to insure the data concerning the assembly is readily available and not separated from the assembly. The method and apparatus described herein provide a way to manage the history of a manufactured assembly in a complex supply chain to reduce the costs of maintaining data from multiple vendors and other costs associated with re-configuring product assemblies.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

The invention claimed is:

1. A method for utilizing a radio frequency identification (RFID) tag in manufacturing comprising the steps of:
   a first vendor storing data for an initial manufacturing event in an as built history on the RFID tag associated with a manufactured assembly;
   a second vendor storing additional data for a second manufacturing event into the as built history on the RFID tag, wherein the data for the initial and second manufacturing events include a part number, a vendor identification and other data for a sub-assembly of the manufactured assembly; and wherein the step of storing the additional data for the second manufacturing event comprises a micro-controller on the RFID tag processing commands from an RFID reader to append the data of the second manufacturing event to the data for the initial manufacturing event in a dynamically linked list in the as built history that creates a hierarchical history of the manufactured assembly; wherein the dynamically linked list includes a previous link and a next link to point to a previous record and a next record, respectively;
   wherein the step of storing the data for the initial and second manufacturing events in the dynamically linked list comprises storing a different part number and serial number for each sub-assembly installed into the manufactured assembly, and the vendor of the sub-assembly to reflect a changing nature of the assembly as sub-assemblies are added to the assembly; and
   wherein the data for the second manufacturing event includes at least one quality status parameter.

2. The method of claim 1 wherein data for the initial and second manufacturing events include a vendor ID, a part number, a serial number, a date and time, and other associated data for each manufacturing event.

3. The method of claim 1 wherein the at least one quality status parameter includes a good/no good indication of usability of the assembly.

4. A tangible, computer-readable non-transitory signal bearing medium bearing computer-executable instructions for performing the method of claim 1.

5. An RFID tag associated with a manufactured assembly comprising:
   an antenna;
   an RFID chip connected to the antenna to receive a communication signal from an RFID reader;
   an as built history stored on the RFID chip that includes data for a plurality of manufacturing events for a plurality of sub-assemblies that comprise the manufactured assembly; wherein data for a first manufacturing event is stored by a first vendor and data for a second manufacturing event is stored by a second vendor, wherein at least one quality status parameter is stored in the as built history;
   a micro-controller to process commands from the RFID reader to append data for the first manufacturing event with data from the second manufacturing event in the as built history in a dynamically linked list wherein the dynamically linked list includes a previous link and a next link to point to a previous record and a next record, respectively; and
   wherein data for the plurality of manufacturing events include a vendor ID, a part number, a serial number, and a date and time for each sub-assembly installed into the manufactured assembly to reflect a changing nature of the assembly as sub-assemblies are added to the assembly.

6. The RFID tag of claim 5 wherein the at least one quality status parameter includes a good/no good indication of usability of the assembly.

7. An RFID tag associated with a manufactured assembly comprising:
   an antenna;
   an RFID chip connected to the antenna to receive a communication signal from an RFID reader;
   a micro-controller to manage commands received from the RFID reader;
   an as built history stored on the RFID chip that includes data for a plurality of manufacturing events for a plurality of sub-assemblies that comprise the manufactured assembly wherein data for a first manufacturing event is stored by a first vendor and data for a second manufacturing event is stored by a second vendor, wherein at least one quality status parameter is stored in the as built history;
   wherein the micro-controller, in response to commands received from the RFID reader, appends data for the first manufacturing event with data from the second manufacturing event in the as built history in a dynamically linked list that creates a hierarchical history of the manufactured assembly wherein the dynamically linked list includes a previous link and a next link to point to a previous record and a next record, respectively; and
   wherein the data for the plurality of manufacturing events in the dynamically linked list includes a vendor ID, a part number, a serial number, and a date and time for each sub-assembly installed into the manufactured assembly to reflect a changing nature of the assembly as sub-assemblies are added to the assembly.

8. The RFID tag of claim 7 wherein the at least one quality status parameter includes a good/no good indication of usability of the assembly.

* * * * *